US009842278B2

(12) United States Patent
Cheng et al.

(10) Patent No.: US 9,842,278 B2
(45) Date of Patent: Dec. 12, 2017

(54) IMAGE ANALYSIS AND ORIENTATION CORRECTION FOR TARGET OBJECT DETECTION AND VALIDATION

(71) Applicant: Seedonk, Inc., Fremont, CA (US)

(72) Inventors: Fred Cheng, Los Altos Hills, CA (US); Herman Yau, Sunnyvale, CA (US)

(73) Assignee: Tend Insights, Inc., Fremont, CA (US)

( * ) Notice: Subject to any disclaimer, the term of this patent is extended or adjusted under 35 U.S.C. 154(b) by 277 days.

(21) Appl. No.: 14/953,420

(22) Filed: Nov. 29, 2015

(65) Prior Publication Data

US 2017/0154426 A1 Jun. 1, 2017

(51) Int. Cl.

| | |
|---|---|
| ***G06K 9/00*** | (2006.01) |
| ***G06K 9/62*** | (2006.01) |
| ***G06T 7/00*** | (2017.01) |
| ***H04N 19/00*** | (2014.01) |

(52) U.S. Cl.

CPC ......... *G06K 9/6215* (2013.01); *G06K 9/6255* (2013.01); *G06T 7/0002* (2013.01); *H04N 19/00* (2013.01); *G06T 2207/10016* (2013.01); *G06T 2207/30168* (2013.01); *G06T 2207/30196* (2013.01)

(58) Field of Classification Search

CPC .. G06K 9/6215; G06K 9/6255; G06T 7/0002; H04N 19/00

See application file for complete search history.

(56) References Cited

U.S. PATENT DOCUMENTS

| | | | | |
|---|---|---|---|---|
| 2003/0053679 | A1 * | 3/2003 | Horn .................. | G01L 311/005 382/152 |
| 2007/0065004 | A1 * | 3/2007 | Kochi .................... | G01C 11/06 382/162 |
| 2012/0121135 | A1 * | 5/2012 | Kotake .................. | G01S 5/163 382/103 |
| 2015/0206023 | A1 * | 7/2015 | Kochi .................... | G01B 11/00 382/199 |
| 2016/0155235 | A1 * | 6/2016 | Miyatani ................ | G06K 9/036 382/103 |
| 2017/0103511 | A1 * | 4/2017 | Sharma ................. | G06T 7/0002 |

* cited by examiner

*Primary Examiner* — Wesley Tucker

(74) *Attorney, Agent, or Firm* — Jingming Cai; SAC Attorneys LLP

(57) ABSTRACT

A method and an image analysis system including an orientation correction processor (OCP), a spatial sensor, and an analytics unit for detecting a target object from an image and validating the detection of the target object are provided. The OCP receives and processes image data from a series of image frames captured by an image sensor and spatial data from the spatial sensor. The OCP generates orientation data using the image data, the spatial data, timestamp data, and lens data of the image sensor. The OCP generates resultant image data by associating the generated orientation data with the received and processed image data simultaneously for each image frame. The analytics unit, in communication with the OCP, processes and analyzes the generated resultant image data with reference to an analytic dataset library to detect the target object from the image and validate the detection of the target object.

28 Claims, 9 Drawing Sheets

IMAGE ANALYSIS AND ORIENTATION CORRECTION FOR TARGET OBJECT DETECTION AND VALIDATION

BACKGROUND

A camera's perception of an object typically results from three factors comprising, for example, an orientation of the camera with respect to the object, a depth of a field of the camera associated with the object, and a lens of the camera. By determining these factors associated with a particular image or a video, an accurate image analysis or video analysis can be performed for detection of a target object in the image or the video. Conventional cameras employ methods for sensing the depth associated with a target object. Typically, an image of an object captured by a camera appears different when captured from different perspectives, that is, when the camera is positioned in different orientations with respect to the object. Moreover, lens distortion of the lens of the camera further affects the appearance of the object in the image. Hence, both these factors, that is, camera orientation and camera lens distortion are variables to be considered to perform image analysis.

A conventional digital video camera records video data through an image sensor. An image signal processor processes the video data to enhance the video image quality. The image signal processor then transmits the processed video data to a video data compression processor configured with a video compression technology for compressing the processed video data. The video compression technology depends on different parameters of the video data comprising, for example, type of the video data, size of the video data, etc. A storage unit of the video camera stores the compressed video data in a local disk. The compressed video data can also be transferred to a server or a cloud database for further analytic processing of the video data.

Typically, a conventional camera records an image of an object as seen by the lens of the camera. Consider an example where multiple cameras, for example, a Camera 1, a Camera 2, and a Camera 3 are positioned at different orientations with respect to an object. When Camera 1 is positioned in a straight horizontal line with respect to the object and is oriented to face the object directly, Camera 1 records a complete image of the object without distortion. Therefore, an Image 1*a* that Camera 1 records, retains a proper aspect ratio between various dimensions of the object. Consider that Camera 2 is positioned on a top left side with respect to the object and is oriented to face diagonally down at the object. The orientation of Camera 2 is different from that of Camera 1 with respect to the target object. If the target object is, for example, a tree, then the aspect ratio of the tree's trunk and the tree's body is reduced in Image 2*a* that Camera 2 captures, when compared to Image 1*a* that Camera 1 captured. Therefore, in Image 2*a*, the tree's body appears slender when compared to the tree's body in Image 1*a*. Consider that the Camera 3 is positioned on the lower left side with respect to the object and is oriented to face diagonally up at the object. In Image 3*a* that Camera 3 captures, the tree's trunk appears taller and the tree's body appears larger when viewed from the lens of Camera 3. Thus, the tree's aspect ratio in Image 3*a* is different from the tree's aspect ratio in Image 1*a*. This difference in the aspect ratios results in distortions of the recorded images and leads to errors in image analysis. Such errors result in an inaccurate video and image analysis. An inaccurate image and/or video analysis further results in false target object detection due to the distortions in the recorded image and/or video data.

Typically, a video and image analysis system requires a large amount of financial and manpower resources for developing a useful dataset library for an analytic algorithm and an analytic engine. Enriching and generating such dataset libraries is time consuming, tedious, and a continuous process. The dataset library should cover image variations from the perception of a camera, for example, from different orientations of a camera, and should cover environmental factors, for example, climatic changes, lighting changes, etc., that may affect the images of the target object. Moreover, there are different types of cameras being used in the market. Furthermore, the target objects may pose in different forms and shapes, and the recording of such objects may happen at various times and in various seasons. Therefore, developing an analytic dataset library covering different types of cameras and applications is a tedious and time consuming process.

Hence, there is a long felt but unresolved need for a method and an image analysis system that perform an enhanced image analysis for enhanced detection of a target object from an image and for validating the detection of the target object. Moreover, there is a need for a method and an image analysis system that optimize an image analysis by considering the camera orientation and the camera lens distortion variables. Furthermore, there is a need for a method and an image analysis system that configure and enrich an analytic dataset library covering different types of cameras, different orientations of a camera, different environmental factors that may affect the images of the target object, different forms and shapes of the target object, etc.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended to determine the scope of the claimed subject matter.

The method and the image analysis system disclosed herein address the above mentioned need for performing an enhanced image analysis for enhanced detection of a target object from an image, for example, a distorted image, and for validating the detection of the target object. Moreover, the method and the image analysis system disclosed herein optimize an image analysis by considering the camera orientation and the camera lens distortion variables. Furthermore, the method and the image analysis system disclosed herein configure and enrich an analytic dataset library covering different types of cameras, different orientations of a camera, different environmental factors that may affect the images of the target object, different forms and shapes of the target object, etc.

The image analysis system disclosed herein comprises an orientation correction processor, a spatial sensor, and an analytics unit. The orientation correction processor receives and processes image data of the target object from a series of image frames captured by an image sensor and spatial data from the spatial sensor of the image analysis system. The image data comprises, for example, image data captured by the image sensor and processed by an image signal processor. The spatial data comprises, for example, spatial coordinates of a center point of the image sensor, spatial coordinates of the image sensor with respect to a horizontal ground plane, relative coordinates of the target object in each of the image frames, and spatial alignment data of the image sensor with respect to the target object. The spatial data defines an orientation of the target object with respect to the image capture device that accommodates the image sensor. The orientation correction processor generates orientation data using the received and processed image data, the received and processed spatial data, timestamp data, and supplementary input data. The supplementary input data comprises, for example, a type of a lens of the image sensor, a curvature of the image sensor, a size of the image sensor, and a resolution of the image sensor. The orientation correction processor generates resultant image data by associating the generated orientation data with the received and processed image data simultaneously for each of the image frames. The analytics unit receives the generated resultant image data from the orientation correction processor. The analytics unit processes and analyzes the received resultant image data with reference to an analytic dataset library to detect the target object from the image and validate the detection of the target object.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
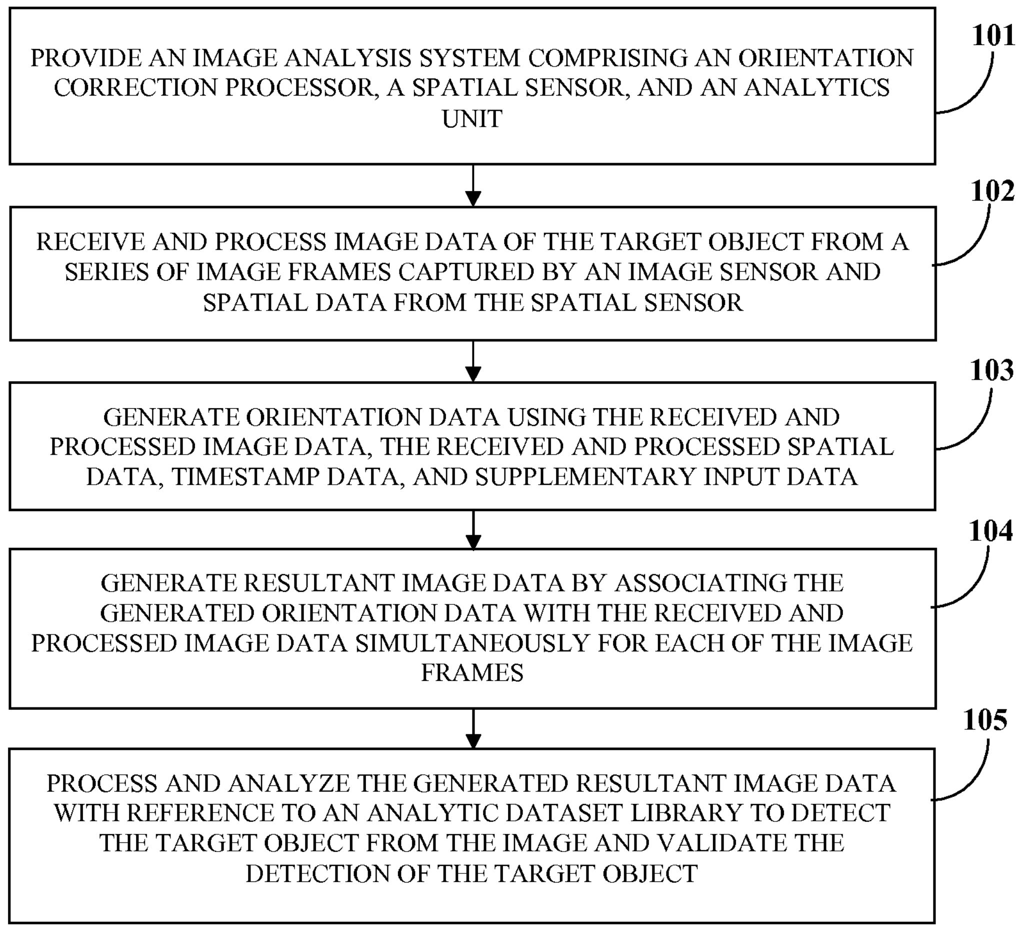
FIG. 1 illustrates a method for detecting a target object from an image and validating the detection of the target object.

FIG. 1 illustrates a method for detecting a target object from an image and validating the detection of the target object. The method disclosed herein facilitates generation of an optimized analysis result of target object detection from an image, for example, a distorted image and/or video data. If an image capture device, for example, a camera is placed at a proper orientation with respect to a target object, the image from which the target object is to be detected may not be distorted. The method disclosed herein resolves inaccuracies in an image analysis, resulting from an image distortion caused by an improper orientation of the image capture device with respect to the target object. In the method disclosed herein, an image analysis system 303 comprising an orientation correction processor 304, a spatial sensor 305, and an analytics unit 309 as exemplarily illustrated in FIGS. 3-4, FIG. 6, and FIG. 8, is provided 101. In an embodiment, the image analysis system 303 is incorporated in the image capture device. In another embodiment, one or more components, for example, the orientation correction processor 304 and the spatial sensor 305 of the image analysis system 303 are incorporated in the image capture device, while other components, for example, the analytics unit 309 operably communicate with the image capture device via a network 501 exemplarily illustrated in FIG. 5 and FIG. 7.

The orientation correction processor 304 of the image analysis system 303 receives and processes 102 image data of the target object from a series of image frames captured by an image sensor 301, and spatial data from the spatial sensor 305 of the image analysis system 303. The image data is obtained, for example, from a video captured by the image sensor 301. The image data comprises, for example, image data captured by the image sensor 301. The spatial data comprises, for example, spatial coordinates of a center point of the image sensor 301, spatial coordinates of the image sensor 301 with respect to a horizontal ground plane, relative coordinates of the target object in each image frame, spatial alignment data of the image sensor 301 with respect to the target object, etc. The spatial data defines an orientation of the target object with respect to an image capture device that accommodates the image sensor 301. The spatial data that the spatial sensor 305 senses, defines the orientation associated with a horizontal spatial position of the image sensor 301 with respect to the target object.

The image sensor 301 is in the horizontal spatial position, for example, when a lens (not shown) of the image sensor 301 is positioned in a horizontal line facing the target object. This spatial data enables the orientation correction processor 304 to determine spatial variations that a captured image of the target object may have. In an embodiment, the orientation correction processor 304 receives supplementary input data comprising, for example, a type of a lens of the image sensor 301, a curvature of the image sensor 301, a size of the image sensor 301, and a resolution of the image sensor 301. In an embodiment, the supplementary input data is loaded into the orientation correction processor 304 during a product manufacturing procedure. The supplementary input data is part of the firmware that is loaded into the image capture device. In an embodiment, the orientation correction processor 304 obtains timestamp data from a timer module (not shown) operably residing within the orientation correction processor 304. The data received by the orientation correction processor 304, for example, the image data, the spatial data, the timestamp data, and the supplementary input data is transformed, processed and executed by an algorithm in the image analysis system 303 for detecting a target object from an image and validating the detection of the target object.

The orientation correction processor 304 generates 103 orientation data using the received and processed image data, the received and processed spatial data, the timestamp data, and the supplementary input data. The timestamp data defines the time of generation of the associated orientation data, thereby allowing separation of previously generated orientation data from other new orientation data which may be generated at a later time. The spatial sensor 305 senses relative spatial angles between the image sensor 301 and a horizontal ground plane and generates the spatial data, for example, in a two-dimensional format. The spatial data represents the orientation of the image sensor 301 with respect to the target object. The orientation correction processor 304 generates the orientation data by transforming the spatial data received from the spatial sensor 305 from two-dimensional coordinate data to three-dimensional spatial locality data.

Figure 2A:
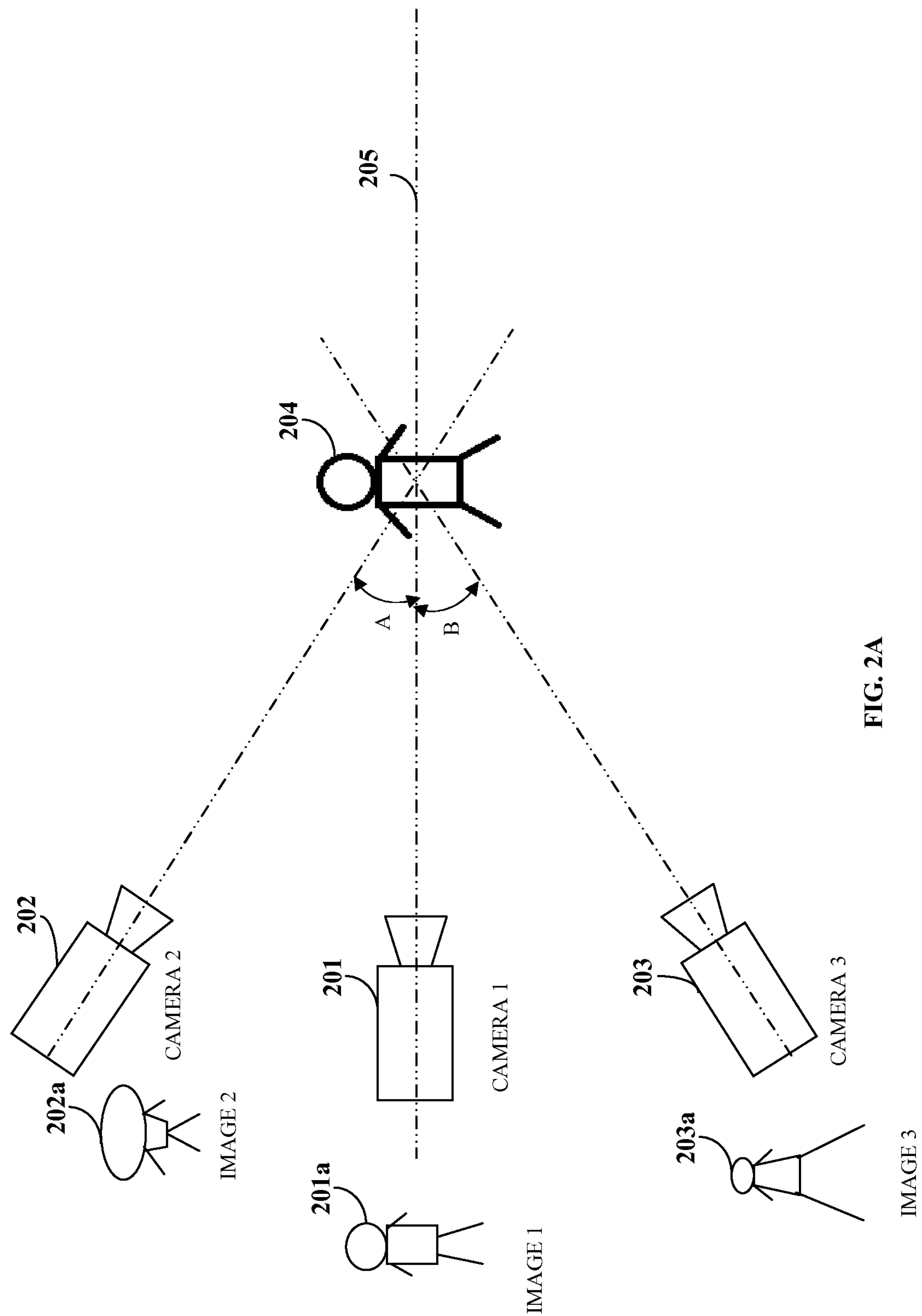
FIG. 2A exemplarily illustrates how an object is viewed by image capture devices positioned at different orientations.
Figure 2B:
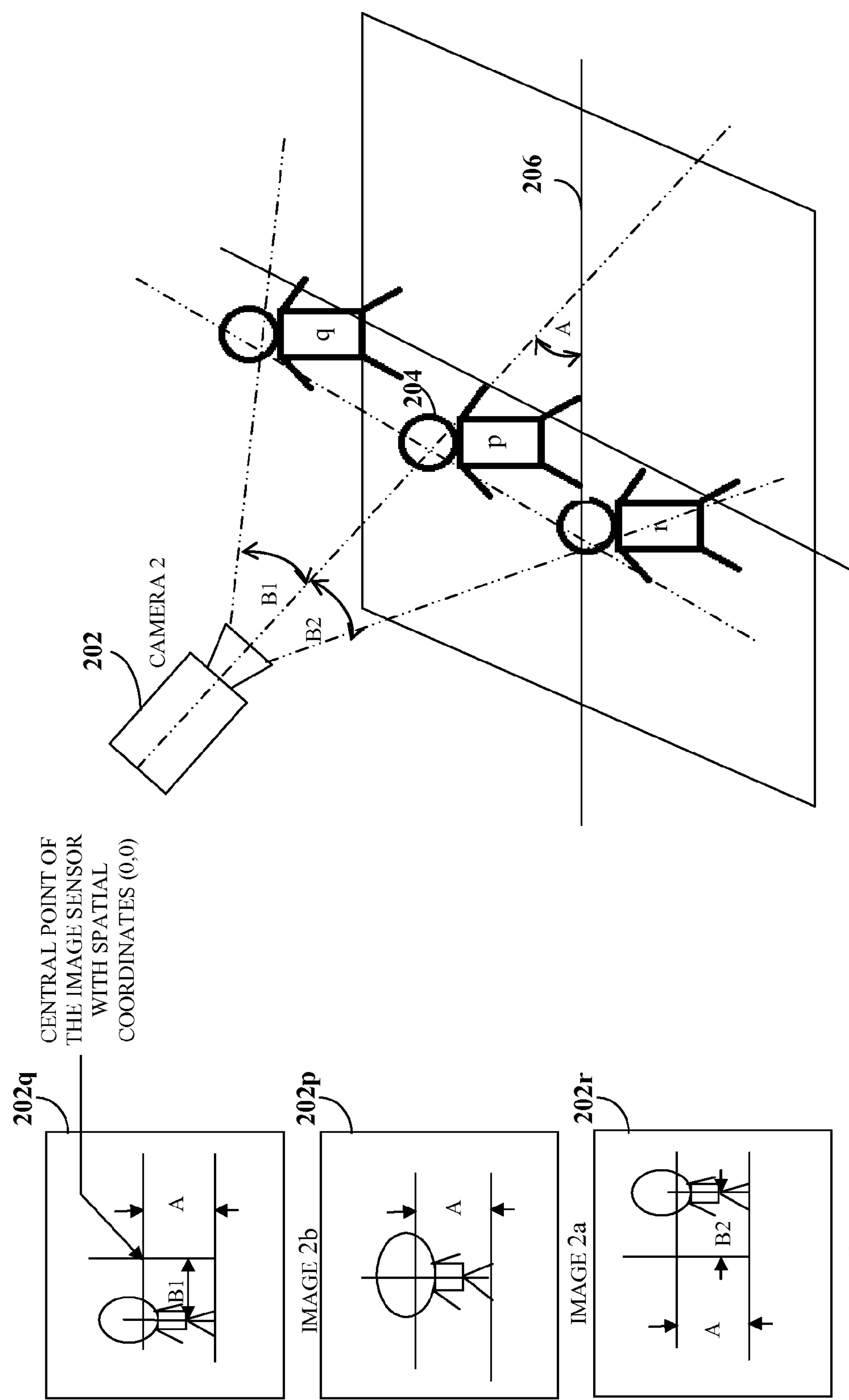
FIG. 2B exemplarily illustrates possible distortion created in an image captured by an image capture device when an object moves from an initial position.

In an example, the orientation correction processor 304 generates the orientation data using the spatial data comprising, for example, angle A exemplarily illustrated in FIG. 2B, that the spatial sensor 305 senses, the relative spatial angle between a center location of an image frame and the target object 204, for example, angles $B_1$ and $B_2$ exemplarily illustrated in FIG. 2B, the timestamp data obtained from the received image data, and the supplementary input data representing the type of the lens used in the image sensor 301. The spatial angles A, $B_1$, and $B_2$ with respect to a horizontal reference plane 206 exemplarily illustrated in FIG. 2B, define the orientations of the camera, for example, camera 2 202 relative to the target object 204. The generated orientation data therefore comprises, for example, the relative spatial data such as the spatial angles A, $B_1$, and $B_2$ exemplarily illustrated in FIG. 2B, between the image sensor 301 and the target object 204. A generic computer using a generic program cannot generate orientation data in accordance with the method steps disclosed above.

The orientation correction processor 304 generates 104 resultant image data by associating the generated orientation data with the received and processed image data simultaneously for each of the image frames. In an embodiment, the orientation correction processor 304 tags the generated orientation data to the received and processed image data simultaneously image frame by image frame. The orientation data generated for an image frame is simultaneously tagged onto the image data in that same image frame in a sequence of the image frames. A generic computer using a generic program cannot generate resultant image data in accordance with the method steps disclosed above. The analytics unit 309 of the image analysis system 303 receives the generated resultant image data from the orientation correction processor 304 via an operations unit 308 exemplarily illustrated in FIGS. 3-4, FIG. 6, and FIG. 8. In an embodiment, the analytics unit 309 comprises an analytic engine **309*a* operably connected to an analytic dataset library 310 as exemplarily illustrated in FIGS. 4-8. The analytic dataset library 310 stores multiple analytic datasets that incorporate image variations from different orientations of the image capture device. The analytic datasets in the analytic dataset library 310 also cover environmental factors, for example, climatic changes, lighting changes, etc., forms and shapes of multiple target objects, time and seasons of image recording, etc. The analytic engine 309*a* of the analytics unit 309 processes and analyzes 105 the received resultant image data with reference to the analytic dataset library 310** to detect the target object from the image and validate the detection of the target object.

In an embodiment, the analytic engine **309*a* performs the detection of the target object in two steps. In the first step, the analytic engine 309*a* performs a gross image comparison on an image frame by image frame basis. The analytic engine 309*a* determines a potential motional object from image differences in consecutive image frames captured by the image sensor 301. The second step involves a finer granularity of the image of the target object. The analytic engine 309*a* compares the motional object determined in the first step detection with the analytic dataset library 310. The analytic dataset library 310 is generated using images captured by multiple different image capture devices in different camera orientations with respect to the target object. If there is a close match in the orientation between the potential motional object and an analytic dataset in the analytic dataset library 310, the analytic engine 309*a* performs the comparison optimally and performs an optimized target object detection. If there is no close match in the orientation data between the potential motional object and an analytic dataset in the analytic dataset library 310, the analytic engine 309*a* updates an aspect ratio of the analytic dataset to make the orientation data of the analytic dataset close to the orientation data of the potential motional object. The analytic engine 309*a* performs an optimized target object detection by performing a dynamic fine tuning on the analytic dataset library 310**.

In an embodiment, the analytic engine **309*a* extracts the orientation data and the image data from the received resultant image data. The analytic engine 309*a* dynamically selects an analytic dataset from the analytic dataset library 310 based on a spatial difference factor determined from the extracted orientation data and the extracted image data to perform an analysis on the received resultant image data. The analytic engine 309*a* compares the extracted image data with the dynamically selected analytic dataset, where a close match of the extracted image data with the dynamically selected analytic dataset validates the detection of the target object. The analytic dataset library 310 contains analytic datasets configured in an object model. The analytic engine 309*a* compares the object model to the image of the target object, herein referred to as an "object image", contained in the received resultant image data. A close match of the object image to an analytic dataset in the object model verifies the correctness of the detection of the target object. The object model is built based on a direct face-to-face captured image where an image capture device is positioned in a horizontal plane or where the image sensor 301** is positioned perpendicular to the target object.

When an object image is captured by the image sensor 301 of the image capture device placed in an elevated position and oriented in a downward direction at an angle, the captured object image is no longer in its ideal condition and the captured object image is distorted depending on the orientation of the image capture device. A direct comparison between the distorted object image and the analytic datasets in the object model therefore cannot produce the desired object detection. To improve and correct this problem, the analytics unit 309 uses a dynamic correction method. The analytic engine 309*a* of the analytics unit 309 determines a spatial difference factor as a distortion ratio of the extracted orientation data and a spatial coordinate difference determined between a center of each of the image frames and the detected target object from the extracted image data, and updates the analytic dataset library 310 in accordance with the distortion ratio. For example, the analytic engine 309*a* receives the orientation data, for example, angle A exemplarily illustrated in FIG. 2B, from the orientation correction processor 304 and calculates the spatial difference factor between the center of the image frame and the detected target object, for example, using the angles $B_1$ and $B_2$ exemplarily illustrated in FIG. 2B. The orientation data and the spatial difference factor provide a relative distortion ratio of the target object on its X and Y dimensions. The analytic engine 309*a* adjusts the object model according to this relative distortion ratio. The comparison of the adjusted object model to the detected object image therefore allows a substantially optimized and validated detection of the target object. The analytic engine 309*a* selects an analytic dataset library 310 that has the smallest spatial difference factors for performing an analytic comparison.

Given the orientation data, the analytic engine 309*a* determines the spatial difference factors from the orientation data and the image data and selects an orientation adjusted and optimized analytic dataset from the analytic dataset library 310 to obtain an optimized analysis result. The optimized analytic dataset refers to a dataset model that has been adjusted on its X-Y ratio in proportion to the relative distortion ratio calculated as disclosed above. The orientation data enables the analytic engine 309*a* to select the optimized analytic dataset to analyze the image and detect the target object with accuracy. The analytic dataset library 310 comprises images of objects captured with certain orientation data. Consider an example where the analytic dataset library 310 has a spatial coordinate as (A, 0) as the object exemplarily illustrated in the image 2*a* 202*p* in FIG. 2B, and a potential motional object with a spatial coordinate (A, $-B_1$) as exemplarily illustrated in the image 2*b* 202*q* in FIG. 2B. In an embodiment, "spatial difference factors" refer to differences of spatial coordinates between an image captured by an image capture device and images or analytic datasets stored in the analytic dataset library 310. The analytic engine 309*a* determines the spatial difference factor between the analytic dataset library 310 and an image of the potential motion object, for example, as (A−A, $0-(-B_1)$). A lookup table within the analytic dataset library 310 shows an X and Y axial image size correction factor versus the spatial difference factors. Such correction ratios are the actual measurement data when the image sensor 301 and the lens of the image sensor 301 are used for a particular image capture device. The analytic engine 309*a* adds the correction ratios into the lookup table in the analytic dataset library 310 for future use. The image 2*a* 202*p* of the object and the image 2*b* 202*q* of the potential motional object have the same X coordinates, that is, both the images are in the same horizontal line with respect to the image sensor 301. Hence, there is no distortion, for example, a vertical or Y dimensional distortion on the height between the two images 202*p* and 202*q*. The difference of "B1" indicates there is a distortion, for example, a horizontal or X dimensional distortion on the widths of the images 202*p* and 202*q*. The lookup table provides a distortion correction ratio according to the "B1" value. The analytic engine 309*a* modifies the image 202*q* of the potential motional object by the distortion correction ratio before starting the comparison of the image 202*q* of the potential motional object with the analytic dataset library 310. The dynamic fine tune on the aspect ratio of the image 202*q* of the potential motional object ensures an optimized detection of the motional object and an optimized object recognition. Each analytic dataset library 310 is associated with a set of orientation data and spatial difference factors. The self-learning capability allows an analytic dataset generation engine 309*b* of the analytics unit 309 exemplarily illustrated in FIGS. 6-8, to update the analytic dataset library 310 automatically. The analytic dataset generation engine 309*b* enriches the analytic dataset library 310 to cover multiple different aspects of orientations and spatial difference factors.

FIG. 2A exemplarily illustrates how an object 204, for example, a person is viewed by image capture devices positioned at different orientations. Camera 1 201 is positioned in a "face-to-face" horizontal orientation with respect to the person. When Camera 1 201 is in a direct face-to-face horizontal orientation with respect to the person, the angle A with respect to a horizontal reference line 205 is 0. This angle constitutes the spatial data sensed by the spatial sensor 305 exemplarily illustrated in FIGS. 3-4, FIG. 6, and FIG. 8. The person's image 201*a* captured by Camera 1 201 maintains a proper aspect ratio as the person himself/herself. The person's image 201*a* is at coordinates (0, 0) in an image frame and at spatial coordinates of (0, 0). Aspect ratios of images 202*a* and 203*a* captured by Camera 2 202 and Camera 3 203 respectively, are distorted due to non-ideal orientations of Camera 2 202 and Camera 3 203 with respect to the person. The object's 204 image aspect ratio distortion is typically the most visible distortion resulting from the orientations of the image capture devices with respect to the object 204. The object image's X-Y aspect ratio becomes wider at a horizontal edge of an image frame or the object image's X-Y aspect ratio becomes taller at a vertical edge of the image frame. In an embodiment, the image analysis system 303 provides a dynamic correction on such aspect ratio distortion. Hence, target object detection, motional object detection, and object recognition accuracy are enhanced.

FIG. 2B exemplarily illustrates possible distortion created in an image captured by an image capture device when an object 204, for example, a person moves from an initial position. FIG. 2B shows the possible distortion for Camera 2 202 with a vertical orientation angle of A with respect to a horizontal reference plane 206 exemplarily illustrated in FIG. 2B, sensed by the spatial sensor 305 exemplarily illustrated in FIGS. 3-4, FIG. 6, and FIG. 8, when a person moves away from the initial position. Angle A is a relative vertical orientation angle of Camera 2's 202 image sensor 301 exemplarily illustrated in FIGS. 3-4, FIG. 6, and FIG. 8. Camera 2 202 is oriented in a downward direction towards the person positioned at a location "p" having coordinates of (0, 0) in the image frame and spatial coordinates (A, 0). The captured distorted image is exemplarily illustrated in image 2*a* 202*p* in FIG. 2B. When the person moves away to the location "q" with an angle of $B_1$ to the center point of Camera 2's 202 image sensor 301 having spatial coordinates (A, $-B_1$), Camera 2 202 captures another distorted image, that is, image 2*b* 202*q*. When the person moves away to a location "r" with an angle of $B_2$ to the center point of Camera 2's 202 image sensor 301 having spatial coordinates (A, $B_2$), the Camera 2 202 captures another distorted image, that is, image 2*c* 202*r*. The difference between the person's spatial coordinates and the spatial coordinates at the ideal orientation indicates a body distortion ratio. For example, image 2*c* 202*r* with spatial coordinates (A, $B_2$) exemplarily illustrated in FIG. 2B, and image 1 201*a* with spatial coordinates (0, 0) exemplarily illustrated in FIG. 2A, has a difference of (A, $B_2$). This spatial coordinate difference represents a body ratio distortion rate on its X and Y dimensions. The image analysis system 303 exemplarily illustrated in FIGS. 3-4, FIG. 6, and FIG. 8, allows correction of the distorted image 2*c* 202*r* back to its proper body distortion ratio. The image analysis system 303 enables an enhanced object detection and recognition with an increased accuracy of image and/or video analytics purposes. FIGS. 2A-2B exemplarily illustrate how to use two-dimensional image data to correct a distortion resulting from three-dimensional spatial effects. The method disclosed in the detailed description of FIG. 1 to FIG. 2B, reduces and improves a first level distortion.

Figure 3:
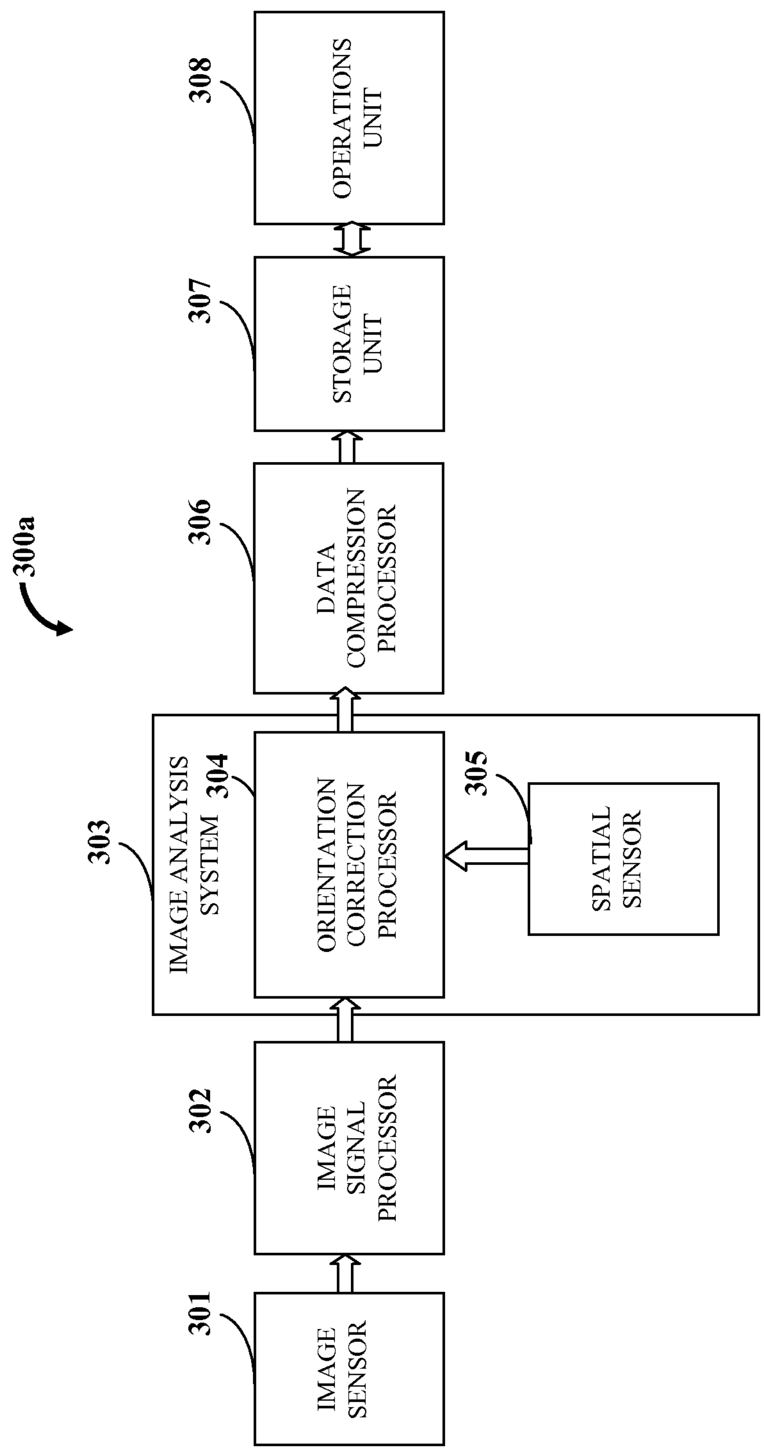
FIG. 3 exemplarily illustrates a block diagram of an analytic image capture device comprising an image analysis system for detecting a target object from an image.

FIG. 3 exemplarily illustrates a block diagram of an analytic image capture device 300*a* comprising the image analysis system 303 for detecting a target object from an image. In an embodiment, the image analysis system 303 in the analytic image capture device 300*a* detects a target object from an image that is distorted, for example, due to a camera being placed at an unfavorable orientation with respect to the target object. In an embodiment, the analytic image capture device 300*a* is a digital camera. The image analysis system 303 is incorporated in a conventional image capture device comprising an image sensor 301, an image signal processor 302 a data compression processor 306, a storage unit 307, and an operations unit 308. The image analysis system 303 comprises the orientation correction processor 304 and the spatial sensor 305. In an embodiment, the orientation correction processor 304 is integrated into the analytic image capture device 300*a*. The storage unit 307 and the operations unit 308 is incorporated as independent units as exemplarily illustrated in FIG. 3. In an embodiment, the storage unit 307 and the operations unit 308 are incorporated in a single unit.

The orientation correction processor 304 refers to any one or more microprocessors, central processing unit (CPU) devices, graphics processing units, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. In an embodiment, the orientation correction processor 304 is implemented as a processor set comprising, for example, a programmed microprocessor and a math or graphics co-processor. The orientation correction processor 304 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The image sensor 301 captures an image of a target object and records the image data. For example, the image sensor 301 captures video data of a target object. The image signal processor 302 processes the recorded image data and/or video data to enhance the video image quality. The image signal processor 302 transmits the enhanced image data and/or video data to the orientation correction processor 304. Addition of the spatial sensor 305 to the analytic image capture device 300*a* enables the orientation correction processor 304 to determine an orientation of the analytic image capture device 300*a* with respect to the target object. The orientation correction processor 304 generates orientation data using the received image data, the spatial data sensed by the spatial sensor 305, and timestamp data, and generates resultant image data, for example, by tagging the generated orientation data to the received image data simultaneously image frame by image frame. In an embodiment, the orientation correction processor 304 uses the supplementary input data representing the type of the lens used in the image sensor 301 for generation of the orientation data. The orientation correction processor 304 transmits the orientation data tagged image data and/or video data to the data compression processor 306 and then to the storage unit 307 and the operations unit 308 for analysis. The data compression processor 306 is in operable communication with the orientation correction processor 304 and compresses the generated resultant image data.

In an embodiment, the storage unit 307 is in operable communication with the orientation correction processor 304 and stores the generated resultant image data. In another embodiment, the storage unit 307 is in operable communication with the data compression processor 306 and stores the compressed resultant image data. The storage unit 307 is any storage area or medium that can be used for storing data and files. The storage unit 307 is, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the storage unit 307 can also be a location on a file system. In another embodiment, the storage unit 307 can be remotely accessed by the image analysis system 303 via a network, for example, the internet. In another embodiment, the storage unit 307 is configured as a cloud based database implemented in a cloud computing environment, where computing resources are delivered as a service over a network. As used herein, "cloud computing environment" refers to a processing environment comprising configurable computing physical and logical resources, for example, networks, servers, storage, applications, services, etc., and data distributed over a network. The operations unit 308 provides an input/output interface for transmitting the stored resultant image data from the storage unit 307 to the analytics unit 309 exemplarily illustrated in FIGS. 4-8 for analysis. The operations unit 308 comprises physical interfaces, input devices, and output devices required, for example, for interfacing with the analytics unit 309 or external analytics units.

Figure 4:
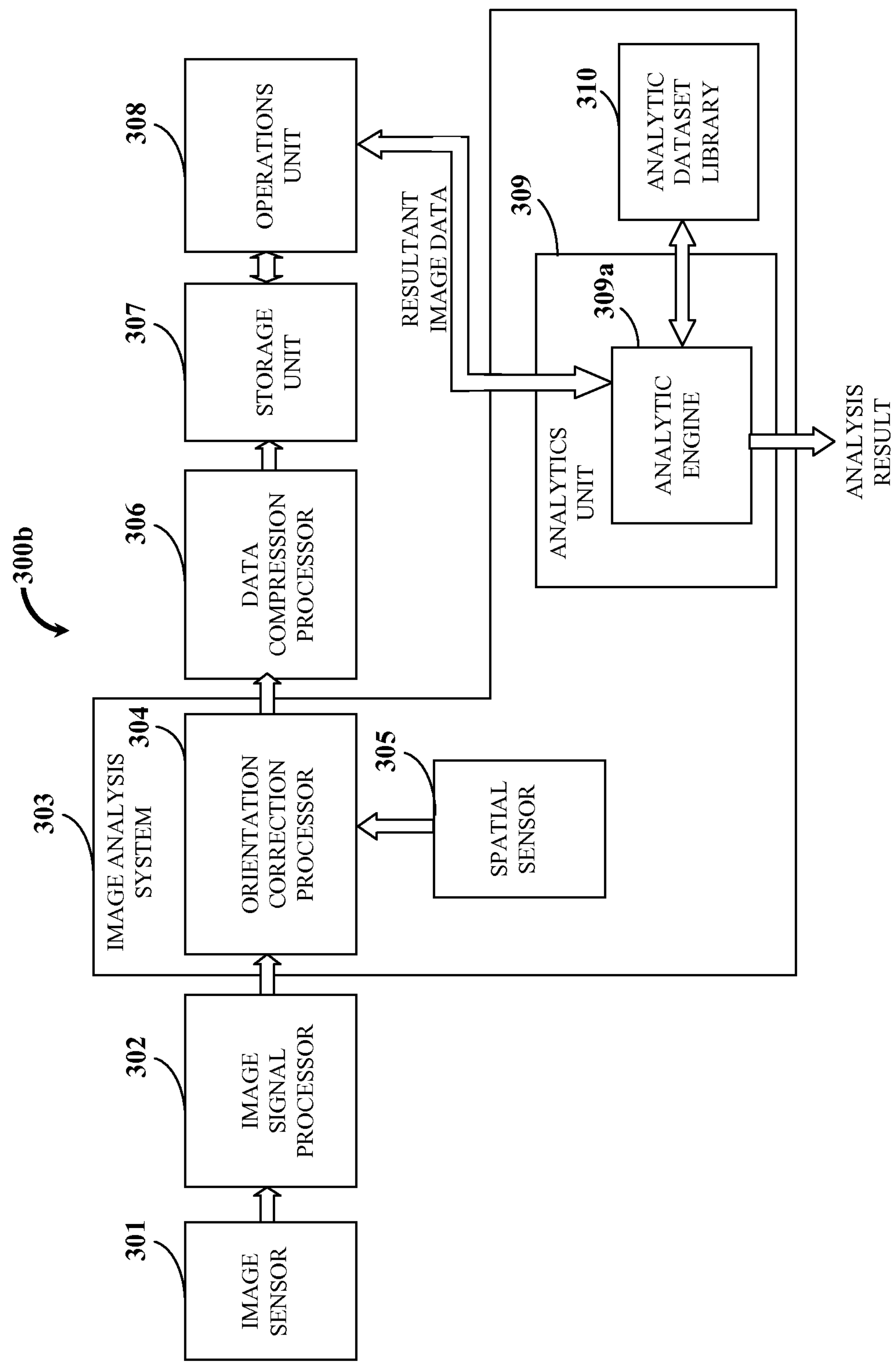
FIG. 4 exemplarily illustrates an implementation of the analytic image capture device with the image analysis system comprising an analytics unit for detecting a target object from an image and validating the detection of the target object.

FIG. 4 exemplarily illustrates an implementation of the analytic image capture device 300*b* with the image analysis system 303 comprising the analytics unit 309 for detecting a target object from an image and validating the detection of the target object. The analytic image capture device 300*b* comprises the image sensor 301, the image signal processor 302, the image analysis system 303, the data compression processor 306, the storage unit 307, and the operations unit 308. In this implementation, in addition to the orientation correction processor 304 and the spatial sensor 305, the image analysis system 303 further comprises the analytics unit 309 and the analytic dataset library 310. In this embodiment, the operations unit 308 is in a direct physical connection with the analytic engine 309*a* of the analytics unit 309. The operations unit 308 transmits the resultant image data to the analytic engine 309*a*. The resultant image data comprises, for example, orientation data tagged to the image data recorded by the image sensor 301 as disclosed in the detailed description of FIG. 1.

The analytic engine 309*a* receives the resultant image data and extracts the orientation data and the image data from the received resultant image data. The analytic engine 309*a* is in operable communication with the analytic dataset library 310. The analytic engine 309*a* dynamically selects an analytic dataset from the analytic dataset library 310 based on a spatial difference factor determined from the extracted orientation data and the extracted image data. For example, the analytic engine 309*a* dynamically selects an analytic dataset from the analytic dataset library 310 based on the distortion ratio determined using the extracted orientation data as disclosed in the detailed description of FIG. 1. During the analysis, the analytic engine 309*a* uses the dynamically selected analytic dataset to perform an optimized image analysis and target object detection from the image data of the image. The analytic engine 309*a* outputs an analysis result comprising a validated detection signal and a detected target object from the image data of the image captured by the image sensor 301.

The orientation correction processor 304, the data compression processor 306, and the analytic engine 309*a* execute computer program codes for performing respective functions disclosed in the detailed description of FIGS. 1-3. The computer program codes comprising computer executable instructions are embodied on a non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. In an embodiment, the orientation correction processor 304, the data compression processor 306, and the analytic engine 309*a* are configured to be connected in a hardwired mode with hardware logic to perform respective functions disclosed in the detailed description of FIGS. 1-3.

Figure 5:
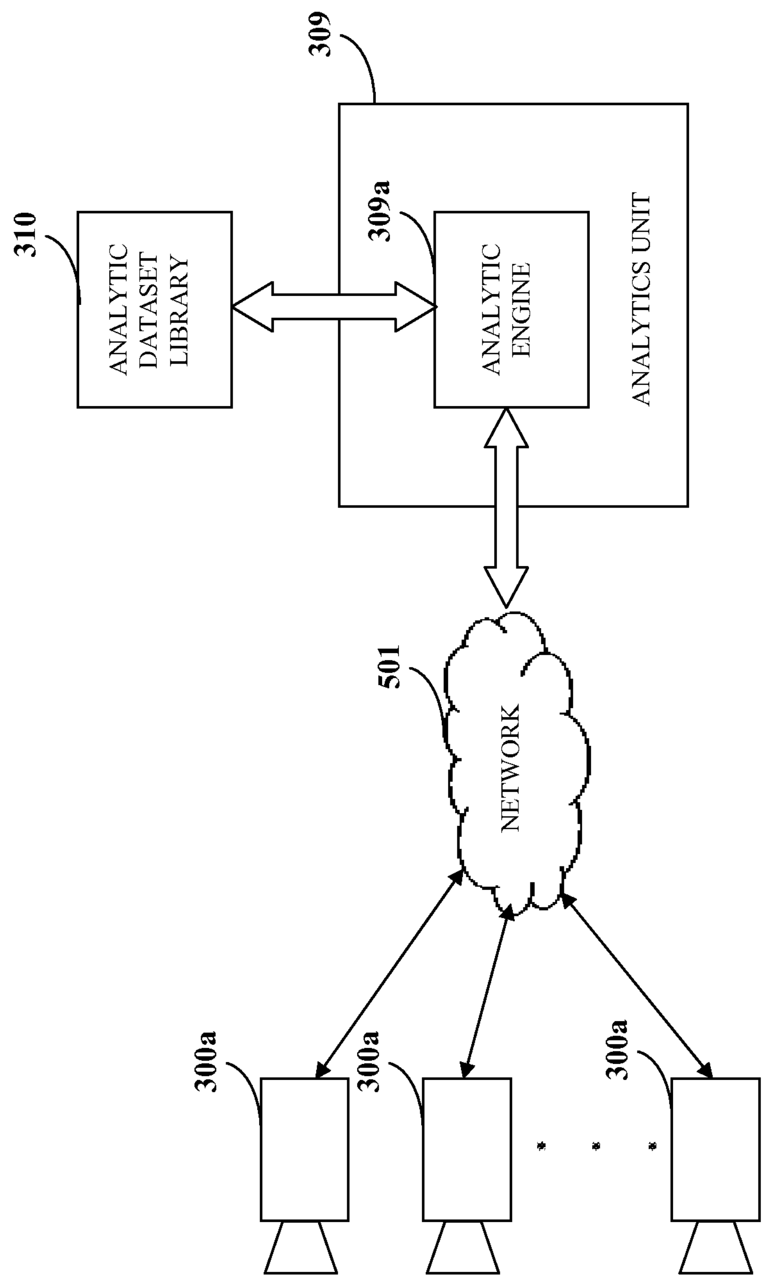
FIG. 5 exemplarily illustrates an embodiment of the image analysis system, showing the analytics unit configured to communicate with multiple analytic image capture devices over a network.

FIG. 5 exemplarily illustrates an embodiment of the image analysis system 303 exemplarily illustrated in FIG. 3, showing the analytics unit 309 configured to communicate with multiple analytic image capture devices 300*a* over a network 501. The network 501 is, for example, the internet, an intranet, a wired network, a wireless network, a network that implements Wi-Fi® of the Wi-Fi Alliance Corporation, Bluetooth® of Bluetooth Sig, Inc., an ultra-wideband network (UWB), a wireless universal serial bus (USB) network, a network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile network, a fourth generation (4G) mobile network, a long-term evolution (LTE) mobile network, a public telephone network, etc., a local area network, a wide area network, an internet connection network, an infrared network, etc., or a network formed from any combination of these networks. The analytic image capture devices 300*a* connect to the analytics unit 309 via the network 501. The storage unit 307 transmits the stored resultant image data to the operations unit 308. In this embodiment, the orientation correction processor 304 and the spatial sensor 305 are incorporated in each analytic image capture device 300*a*.

In an embodiment, the analytics unit 309 is implemented on a server configured to communicate with the orientation correction processor 304 via the operations unit 308 of the analytic image capture device 300*a* via the network 501. FIG. 5 exemplarily illustrates a cloud based analytic service connection between the analytic image capture device 300*a* and the analytics unit 309 for target object detection. In this embodiment, the analytics unit 309 is implemented in a cloud computing environment. Since analysis of the image comprises multiple mathematical operations, the analytic engine 309*a* is configured to reside on the analytics unit 309 implemented as a high power server. In this embodiment, the analytics unit 309 is configured to reside in a data center that connects to each analytic image capture device 300*a* either through the network 501 or through a cloud connection. Therefore, in this embodiment, the operations unit 308 of the analytic image capture device 300*a* transmits the resultant image data to the analytic engine 309*a* of the analytics unit 309 over the network 501 for correctly detecting the target object from the image as disclosed in the detailed description of FIG. 1.

Figure 6:
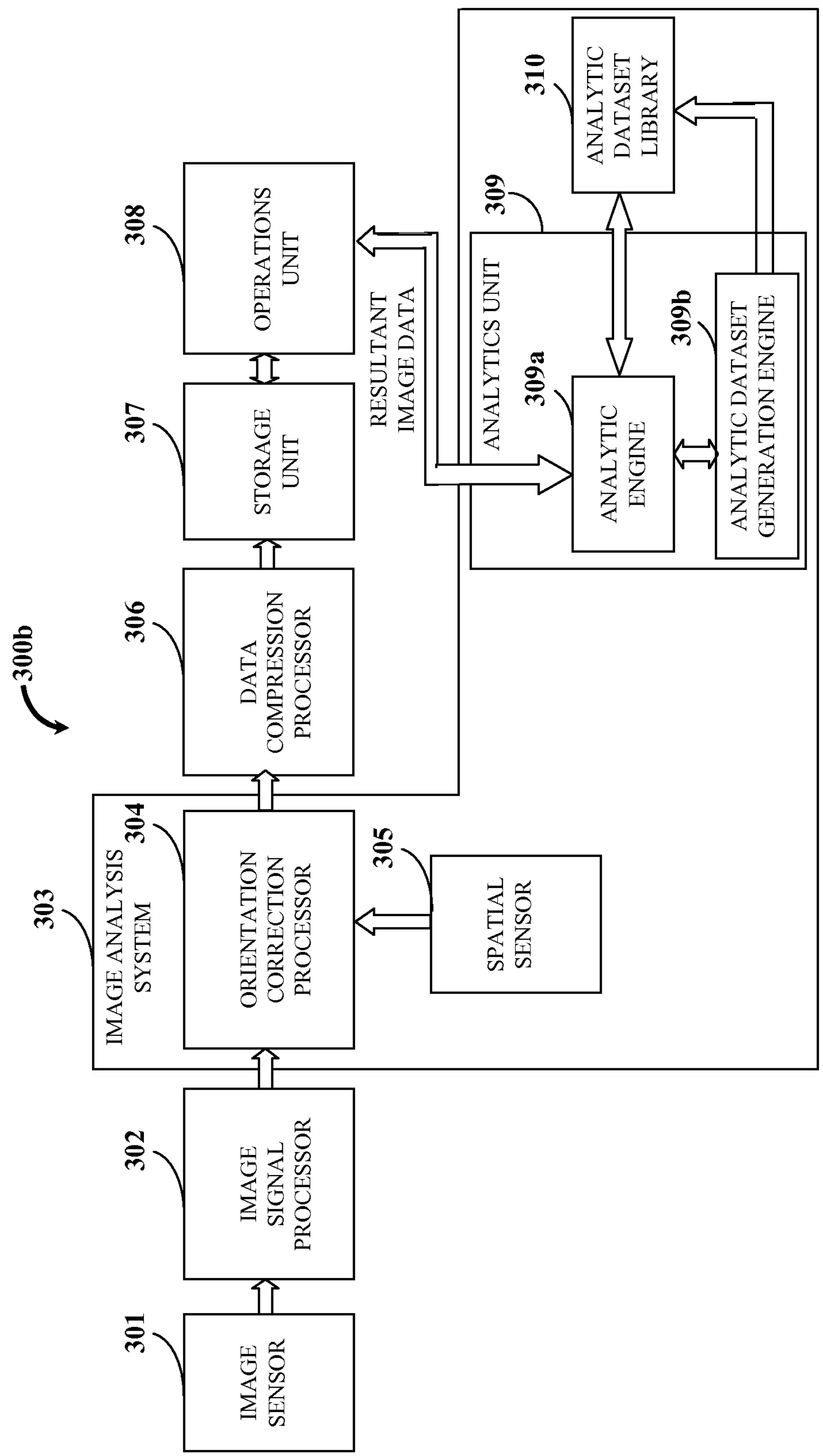
FIG. 6 exemplarily illustrates another implementation of the analytic image capture device with the image analysis system comprising the analytics unit for optimizing an analytic dataset library.

FIG. 6 exemplarily illustrates another implementation of the analytic image capture device 300*b* with the image analysis system 303 comprising the analytics unit 309 for optimizing the analytic dataset library 310. The analytic image capture device 300*b* comprises the image sensor 301, the image signal processor 302, the image analysis system 303, the data compression processor 306, the storage unit 307, and the operations unit 308. In this embodiment, in addition to the analytic engine 309*a*, the analytics unit 309 further comprises an analytic dataset generation engine 309*b* in operable communication with the analytic dataset library 310. In this embodiment, the operations unit 308 is in a direct connection with the analytic engine 309*a*. FIG. 6 exemplarily illustrates an implementation of the analytic image capture device 300*b* with a self-learning capability to enrich the analytic dataset library 310. On receiving the resultant image data from the operations unit 308, the analytic engine 309*a* extracts the orientation data and the image data from the resultant image data and compares the spatial difference factor determined from the extracted orientation data with the analytic dataset library 310. The analytic engine 309*a* notifies the analytic dataset generation engine 309*b* to generate a supplementary analytic dataset comprising the extracted image data associated with the extracted orientation data and the spatial difference factor when a matching analytic dataset for the spatial difference factor is not found in the analytic dataset library 310 within a predetermined variance window. As used herein, "variance window" refers to a range or a window of allowable deviations from the actual spatial difference factor that can be used by the analytic engine 309*a* to select analytic datasets from the analytic dataset library 310. In an example, the analytic engine 309*a* requests the analytic dataset library 310 to send a closest analytic dataset within a desired variance window on the spatial difference factor for video analytics. If the analytic dataset library 310 cannot find such an analytic dataset, the analytic engine 309*a* notifies the analytic dataset generation engine 309*b* to retain the current captured image as a new supplementary analytic dataset for the spatial difference factor. The analytic dataset generation engine 309*b* thereby automatically creates a new dataset library for future analytics. In an embodiment, the analytic engine 309*a* notifies the analytic dataset generation engine 309*b* to update the analytic dataset library 310 by storing the generated supplementary analytic dataset in the analytic dataset library 310, thereby optimizing the analytic dataset library 310. A generic computer using a generic program cannot generate supplementary analytic datasets for optimizing the analytic dataset library 310 in accordance with the method steps disclosed above.

In an embodiment, the orientation correction processor 304 receives and processes image data comprising multiple images of the target object from the image sensor 301 of the analytic image capture device 300*b* and the spatial data from the spatial sensor 305 of the image analysis system 303. The images of the target object are recorded by positioning a lens (not shown) of the image sensor 301 with respect to the target object in one or more of multiple recording configurations. The recording configurations comprise, for example, a predetermined distance, a predetermined orientation, a predetermined time of a day, a predetermined date of a month, etc., and any combination thereof. The orientation correction processor 304 generates orientation data for each of the recorded images using the received and processed image data, the received and processed spatial data, and the supplementary input data. The orientation correction processor 304 generates resultant image data by associating the generated orientation data with the received and processed image data for each of the recorded images. The analytic engine 309*a* of the analytics unit 309 receives this resultant image data and extracts the orientation data and the image data from the resultant image data. The analytic engine 309*a* compares the spatial difference factors determined from the extracted orientation data for each of the recorded images with the analytic dataset library 310. The analytic dataset generation engine 309*b* generates a supplementary analytic dataset associated with the extracted orientation data for each of the recorded images for optimizing the analytic dataset library 310, when a matching analytic dataset for each of the spatial difference factors is not found in the analytic dataset library 310 within a predetermined variance window. The analytic dataset generation engine 309*b* stores the generated supplementary analytic dataset in the analytic dataset library 310 for optimization of the analytic dataset library 310.

Consider an example where an installer installs an analytic image capture device 300*b*. After installing the analytic image capture device 300*b*, for enriching the analytic dataset library 310 by training the analytic image capture device 300*b* for self-learning by the analytic image capture device 300*b*, the installer positions the lens of the image sensor 301 of the analytic image capture device 300*b* to face a preselected target object at a predetermined distance from the lens. The installer trains the analytic image capture device 300*b* by positioning the lens at multiple predetermined distances and in multiple predetermined orientations with respect to the target object. The image sensor 301 records multiple images of the target object at each of the predetermined distances and in each of the predetermined orientations. The installer also performs this training at different times of a day and/or different dates of a month by recording multiple images of the target object at different times of the day and/or different dates of the month. For each distance and orientation, the analytic dataset generation engine 309*b* of the image analysis system 303 in the analytic image capture device 300*b* generates an analytic dataset associated with each of the recorded images. The analytic dataset generation engine 309*b* then compares the analytic dataset against a preconfigured analytic dataset at a predetermined model orientation of the analytic image capture device 300*b*. If this comparison results in a negative match, then the analytic dataset generation engine 309*b* generates a supplementary analytic dataset comprising the image data associated with the orientation data of each of the recorded images. Thus, the analytic dataset generation engine 309*b* prepares each of the recorded images with the orientation data associated with each of the recorded images to generate a new analytic dataset when the orientation data associated with a recorded image fails to match with the preconfigured analytic dataset. The analytic dataset generation engine 309*b* stores the generated analytic dataset in the analytic dataset library 310. After an initial self-learning session of the analytic image capture device 300*b*, for every instant that the image sensor 301 records a new image of the target object and the orientation data associated with this new image fails to match an analytic dataset in the analytic dataset library 310, the analytic engine 309*a* notifies the analytic dataset generation engine 309*b* with this orientation data. Thus, the analytic image capture device 300*b* develops an optimized analytic dataset library 310 through this self-learning process and enriches the analytic dataset library 310 for optimized image data analysis and target object detection.

Figure 7:
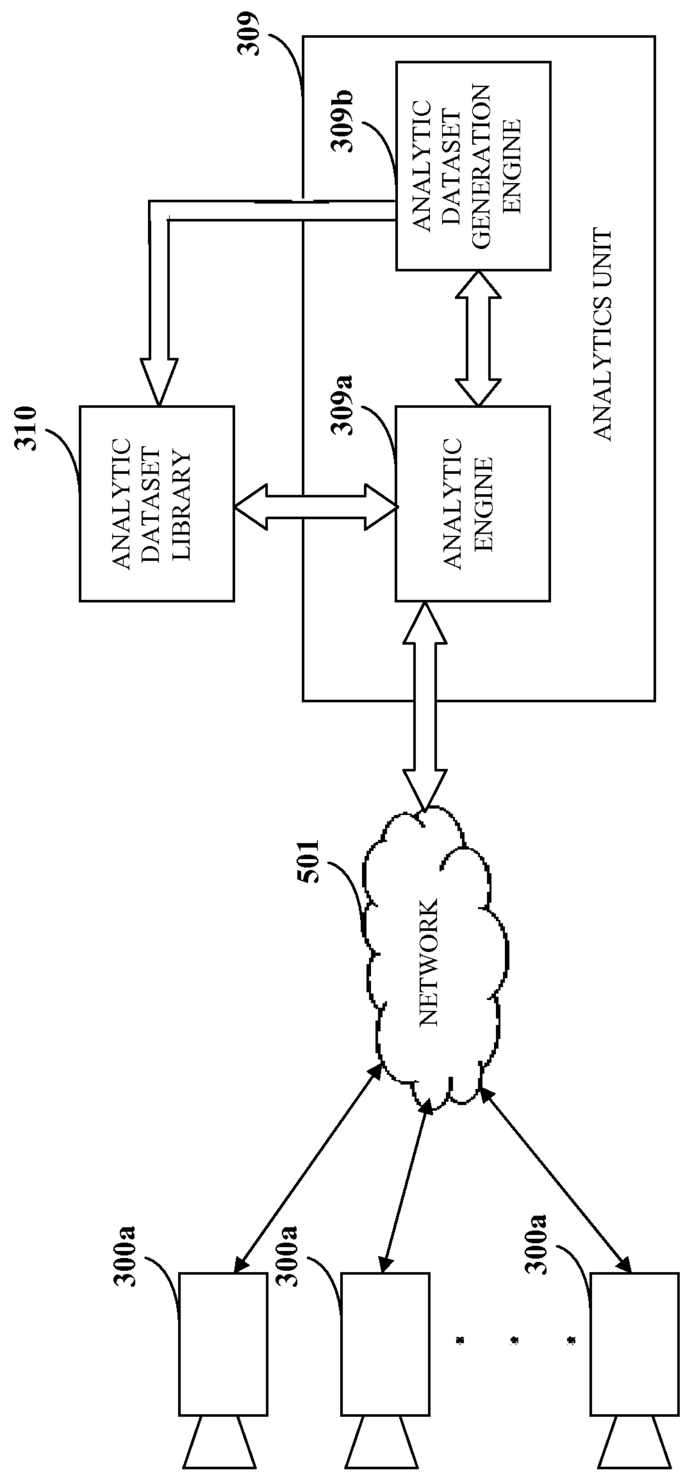
FIG. 7 exemplarily illustrates an embodiment of the image analysis system, showing the analytics unit configured to communicate with multiple analytic image capture devices over a network for detecting a target object from an image, validating the detection of the target object, and optimizing the analytic dataset library.

FIG. 7 exemplarily illustrates an embodiment of the image analysis system 303 exemplarily illustrated in FIG. 3, showing the analytics unit 309 configured to communicate with multiple analytic image capture devices 300*a* over a network 501 for detecting a target object from an image, validating the detection of the target object, and optimizing the analytic dataset library 310. In this embodiment, the analytics unit 309 comprising the analytic engine 309*a* and the analytic dataset generation engine 309*b* is implemented on a server that communicates with the analytic image capture devices 300*a* via the network 501. The analytic engine 309*a* and the analytic dataset generation engine 309*b* are in operable communication with the analytic dataset library 310. In this embodiment, the analytics unit 309 is configured to reside in a data center that connects to each analytic image capture device 300*a* either through the network 501 or through a cloud connection. FIG. 7 exemplarily illustrates cloud based generation and enrichment of the generated analytic dataset library 310.

The analytic dataset generation engine 309*b* optimizes the analytic dataset library 310. In this embodiment, the analytic engine 309*a* is in communication with multiple analytic image capture devices 300*a* over the network 501. Therefore, the analytics unit 309 is implemented on a server configured to communicate with each of the orientation correction processors 304 of each of the image analysis systems 303 of each of the analytic image capture devices 300*a* via respective operations units 308 over the network 501. The analytic engine 309*a* receives and processes the resultant image data from each orientation correction processor 304 and extracts the orientation data and the image data from the received and processed resultant image data. The analytic engine 309*a* compares the spatial difference factors determined from the extracted orientation data and the extracted image data with the analytic dataset library 310. The analytic dataset generation engine 309*b* generates a supplementary analytic dataset comprising the extracted image data associated with the extracted orientation data and the spatial difference factors when a matching analytic dataset for each of the spatial difference factors is not found in the analytic dataset library 310 within a predetermined variance window, and updates the analytic dataset library 310 with the generated supplementary analytic dataset.

Consider an example where multiple analytic image capture devices 300*a* comprising, for example, a Camera 1 to a Camera n are installed at respective remote locations in different orientations with respect to a target object. These analytic image capture devices 300*a* are in operable communication with the analytic engine 309*a* of the analytics unit 309 over the network 501. The analytic image capture devices 300*a* record image data and/or video data and transmit the recorded image data and/or video data to the analytic engine 309*a* of the cloud based analytics unit 309 via the network 501 for analysis. The analytic engine 309*a* extracts orientation data associated with the detected target object from each analytic image capture device's 300*a* recorded image data and/or video data. If the detected target object is associated with the orientation data that is not found in the analytic dataset library 310, the analytic engine 309*a* notifies the analytic dataset generation engine 309*b* to generate a supplementary analytic dataset associated with this orientation data and store the generated analytic dataset in the analytic dataset library 310 for future use. Since multiple analytic image capture devices 300*a* configured with different orientation settings and that record various target object images are connected to the analytic engine 309*a*, developing a large collection of analytic datasets into the analytic dataset library 310 becomes less cumbersome when compared to the conventional manual generation of the analytic dataset library 310. More the number of the analytic image capture devices 300*a* connected to this cloud based analytics unit 309, faster is the speed of building up a comprehensive analytic dataset library 310.

Figure 8:
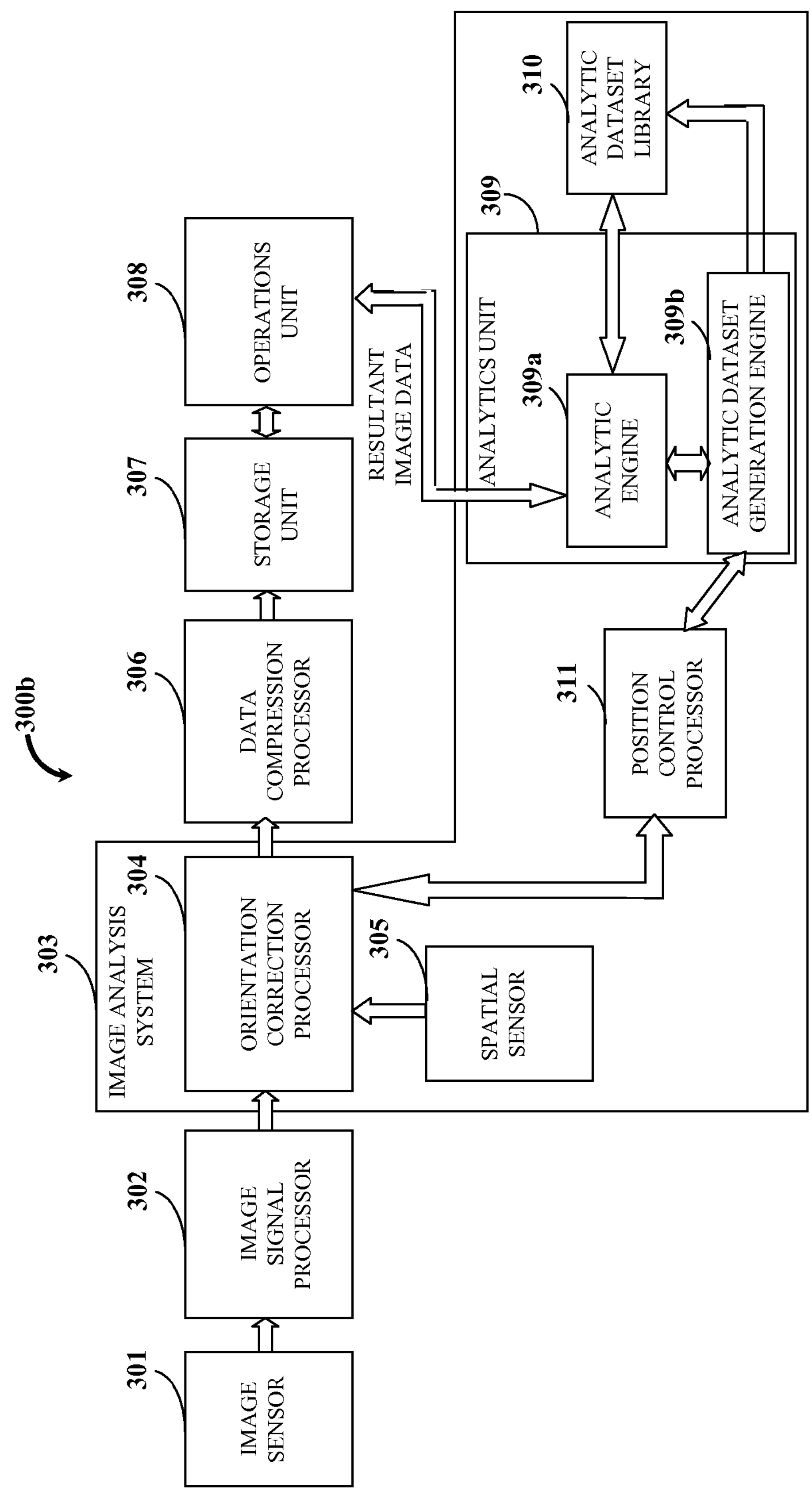
FIG. 8 exemplarily illustrates another implementation of the analytic image capture device with the image analysis system comprising a position control processor for dynamically adjusting an orientation of the analytic image capture device.

FIG. 8 exemplarily illustrates another implementation of the analytic image capture device 300*b* with the image analysis system 303 comprising a position control processor 311 for dynamically adjusting an orientation of the analytic image capture device 300*b*. The analytic image capture device 300*b* comprises the image sensor 301, the image signal processor 302, the image analysis system 303, the data compression processor 306, the storage unit 307, and the operations unit 308. In this embodiment, in addition to the orientation correction processor 304, the spatial sensor 305, the analytics unit 309, and the analytic dataset library 310, the image analysis system 303 further comprises the position control processor 311. The position control processor 311 is in operable communication with the orientation correction processor 304 and the analytic dataset generation engine 309*b* of the analytics unit 309. The position control processor 311 controls one or more configuration parameters of the analytic image capture device 300*b*. The configuration parameters comprise, for example, a pan, a tilt, and a zoom of the analytic image capture device 300*b* with respect to the target object.

On installing the analytic image capture device 300*b*, the spatial sensor 305 enables the orientation correction processor 304 to determine an orientation of the analytic image capture device 300*b* with respect to the target object. The orientation correction processor 304 generates preliminary orientation data using the image data that the image sensor 301 records, the spatial data that the spatial sensor 305 senses, timestamp data, and supplementary input data comprising a type of a lens of the image sensor 301, a curvature of the image sensor 301, a size of the image sensor 301, and a resolution of the image sensor 301. The orientation correction processor 304 then generates resultant image data by associating the preliminary orientation data with the recorded image data and transmits the resultant image data to the analytic engine 309*a* of the analytics unit 309 via the operations unit 308. The analytic engine 309*a* extracts the orientation data and the image data from the resultant image data and compares the spatial difference factor determined from the extracted orientation data and the extracted image data to a range of predetermined orientation data stored in the analytic dataset library 310. If this preliminary orientation data is within the predetermined orientation data range, the orientation of the analytic image capture device 300*b* is maintained. The orientation correction processor 304 determines an orientation correction angle when a matching analytic dataset for the spatial difference factor is not found in the analytic dataset library 310 within a predetermined variance window.

The spatial sensor 305 senses the vertical and horizontal orientation angles of the analytic image capture device 300*b* situated with reference to a horizontal reference plane 206 exemplarily illustrated in FIG. 2B and as disclosed in the detailed description of FIGS. 1-2B. The orientation correction processor 304 receives the orientation data from the spatial sensor 305. The position control processor 311, in communication with the orientation correction processor 304, dynamically adjusts the orientation of the image sensor 301 of the analytic image capture device 300*b* using the determined orientation correction angle. Thus, if the preliminary orientation data is not within the predetermined orientation data range, the orientation correction processor 304 automatically readjusts the orientation of the analytic image capture device 300*b* through the position control processor 311, thereby enabling the analytic image capture device 300*b* to record images in the predetermined orientation data range, for example, for an improved and optimized surveillance requirement. A generic computer using a generic program cannot dynamically adjust the orientation of the image sensor 301 of the analytic image capture device 300*b* using the determined orientation correction angle in accordance with the method steps disclosed above.

In an embodiment, this process of dynamic adjustment of the analytic image capture device 300*b* can be implemented in a reverse order to optimize the analytic dataset library 310. In this embodiment, when the analytic image capture device 300*b* is readjusted to a different orientation through the position control processor 311, the position control processor 311 notifies the analytic dataset generation engine 309*b* about the orientation data associated with the dynamically adjusted, that is, the readjusted orientation of the analytic image capture device 300*b*. The analytic dataset generation engine 309*b* dynamically selects a correspondingly optimized analytic dataset from the analytic dataset library 310 based on an updated spatial difference factor determined using the orientation data and the extracted image data and transmits this analytic dataset to the analytic engine 309*a* for analysis. The analytic engine 309*a* compares the extracted image data with the dynamically selected analytic dataset, where a close match of the extracted image data with the dynamically selected analytic dataset validates the detection of the target object. To optimally validate the detection of a motional object, the analytic engine 309*a* compares the captured object image to a proper analytic dataset library 310. The detected motional object's image may be distorted due to an orientation issue of the image capture device 300*b*. The closer the analytic dataset is to the distorted captured object image, the more improved is the accuracy of the detection of the target object. The analytic engine 309*a* can be set to operate with the analytic dataset library 310 within a certain variation from the captured image. The predetermined variance window of the spatial difference factor should be between the captured image and the analytic dataset library 310 within the variation requirements set by the analytic engine 309*a*. This optimization of the analytic dataset library 310 is useful to a non-professional installer who installs the analytic image capture device 300*b* as an automatic orientation adjustment of the analytic image capture device 300*b* and an optimized analytic dataset selection eases the installation of the analytic image capture device 300*b*.

The image analysis system 303 allows the analytic image capture device 300*b* to be placed at any location even if the analytic image capture device 300*b* may produce a highly distorted image of the target object that may result in inaccurate video analytics. The analytic image capture device 300*b* performs a self-adjustment through the position control processor 311 and a pan-tilt-zoom (PTZ) control available on a mechanical and electronic system of the analytic image capture device 300*b* to resolve the orientation issue. The self-learning capability of the analytic image capture device 300*b* also allows the analytic image capture device 300*b* to build its own analytic dataset library 310 even if the analytic image capture device 300*b* is placed at an orientation that its built-in dataset library does not cover. The image analysis system 303 in the analytic image capture device 300*b* therefore resolves the analytic dataset library 310 with a limited orientation issue. The output of the analytic image capture device 300*b* is to output a validated detection signal and record the detected images.

In the method disclosed herein, the design and flow of interactions between the spatial sensor 305, the orientation processor 304, the analytics unit 309, the position control processor 311, and the analytic dataset library 310 of the image analysis system 303 is deliberate, designed, and directed. The image analysis system 303 implements one or more specific computer programs to output a validated detection signal and record the detected images of the target object. The interactions designed by the image analysis system 303 allow the image analysis system 303 to receive the image data captured by the analytic image capture device 300*a* or 300*b*, the spatial data, etc., and from this data, through the use of another, separate and autonomous computer program, generate the orientation data and the resultant image data for analysis to detect the target object from the image and validate the detection of the target object. To generate the orientation data and the resultant image data, analyze the resultant image data with reference to the analytic dataset library 310, dynamically adjust an orientation of the image sensor 301 of the analytic image capture device 300*b*, and optimize the analytic dataset library 310, requires no less than five separate computer programs, and cannot be easily nor manually executed by a person working with a generic computer.

It will be readily apparent in different embodiments that the various methods, algorithms, and computer programs disclosed herein are implemented on computer readable media appropriately programmed for computing devices. As used herein, "computer readable media" refers to non-transitory computer readable media that participate in providing data, for example, instructions that are read by a computer, a processor or a similar device. The "computer-readable media" further refers to a single medium or multiple media, for example, a centralized database, a distributed database, and/or associated caches and servers that store one or more sets of instructions that are read by a computer, a processor or a similar device. The "computer-readable media" further refers to any medium capable of storing or encoding a set of instructions for execution by a computer, a processor or a similar device and that causes a computer, a processor or a similar device to perform any one or more of the methods disclosed herein. Non-transitory computer readable media comprise all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hardwired circuitry or custom hardware may be used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the image analysis system 303 exemplarily illustrated in FIGS. 3-4, FIG. 6, and FIG. 8, disclosed herein are implemented as programmed elements, or non-programmed elements, or any suitable combination thereof.

Where databases are described, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the image analysis system 303 exemplarily illustrated in FIGS. 3-4, FIG. 6, and FIG. 8, the databases are integrated to communicate with each other for enabling simultaneous updates of data linked across the databases, when there are any updates to the data in one of the databases.

The method and the image analysis system 303 exemplarily illustrated in FIGS. 3-4, FIG. 6, and FIG. 8, disclosed herein can be configured to work in a network environment comprising one or more computers that are in communication with one or more devices via a network 501 exemplarily illustrated in FIG. 5 and FIG. 7. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network 501. Each of the computers and the devices executes an operating system, for example, the Linux® operating system, the Unix® operating system, any version of the Microsoft® Windows® operating system, the Mac OS® of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. While the operating system may differ depending on the type of computer, the operating system provides the appropriate communications protocols to establish communication links with the network 501. Any number and type of machines may be in communication with the computers.

The method and the image analysis system 303 exemplarily illustrated in FIGS. 3-4, FIG. 6, and FIG. 8, disclosed herein are not limited to a particular computer system platform, processor, operating system, or network. In an embodiment, one or more aspects of the method and the image analysis system 303 disclosed herein are distributed among one or more computer systems, for example, servers configured to provide one or more services to one or more client computers, or to perform a complete task in a distributed system. For example, one or more aspects of the method and the image analysis system 303 disclosed herein are performed on a client-server system that comprises components distributed among one or more server systems that perform multiple functions according to various embodiments. These components comprise, for example, executable, intermediate, or interpreted code, which communicate over a network 501 using a communication protocol. The method and the image analysis system 303 disclosed herein are not limited to be executable on any particular system or group of systems, and is not limited to any particular distributed architecture, network, or communication protocol.

The foregoing examples have been provided merely for the purpose of explanation and are in no way to be construed as limiting of the image analysis system 303 exemplarily illustrated in FIGS. 3-4, FIG. 6, and FIG. 8, disclosed herein. While the method and the image analysis system 303 have been described with reference to various embodiments, it is understood that the words, which have been used herein, are words of description and illustration, rather than words of limitation. Further, although the method and the image analysis system 303 have been described herein with reference to particular means, materials, and embodiments, the method and the image analysis system 303 are not intended to be limited to the particulars disclosed herein; rather, the method and the image analysis system 303 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and image analysis system 303 disclosed herein in their aspects.

We claim:

1. A method for detecting a target object from an image and validating the detection of the target object, the method comprising:

providing an image analysis system comprising an orientation correction processor, a spatial sensor, and an analytics unit;

receiving and processing image data of the target object from a series of image frames captured by an image sensor and spatial data from the spatial sensor of the image analysis system, by the orientation correction processor of the image analysis system;

generating orientation data using the received and processed image data, the received and processed spatial data, timestamp data, and supplementary input data by the orientation correction processor;

generating resultant image data by associating the generated orientation data with the received and processed image data simultaneously for each of the image frames by the orientation correction processor; and processing and analyzing the generated resultant image data with reference to an analytic dataset library by the analytics unit, in communication with the orientation correction processor, to detect the target object from the image and validate the detection of the target object.

2. The method of claim 1, wherein the image data comprises image data captured by the image sensor, and wherein the supplementary input data comprises a type of a lens of the image sensor, a curvature of the image sensor, a size of the image sensor, and a resolution of the image sensor.

3. The method of claim 1, wherein the spatial data comprises spatial coordinates of a center point of the image sensor, spatial coordinates of the image sensor with respect to a horizontal ground plane, relative coordinates of the target object in the each of the image frames, and spatial alignment data of the image sensor with respect to the target object, and wherein the spatial data is configured to define an orientation of the target object with respect to an image capture device that accommodates the image sensor.

4. The method of claim 1, wherein the processing and the analysis of the generated resultant image data by the analytics unit of the image analysis system comprises:

extracting the orientation data and the image data from the generated resultant image data by the analytics unit;

dynamically selecting an analytic dataset from the analytic dataset library by the analytics unit based on a spatial difference factor determined from the extracted orientation data and the extracted image data; and comparing the extracted image data with the dynamically selected analytic dataset by the analytics unit, wherein a close match of the extracted image data with the dynamically selected analytic dataset validates the detection of the target object.

5. The method of claim 4, further comprising generating a supplementary analytic dataset comprising the extracted image data associated with the extracted orientation data and the spatial difference factor by the analytics unit when a matching analytic dataset for the spatial difference factor is not found in the analytic dataset library within a predetermined variance window, and updating the analytic dataset library with the supplementary analytic dataset by the analytics unit.

6. The method of claim 4, further comprising:

determining the spatial difference factor as a distortion ratio of the extracted orientation data and a spatial coordinate difference determined between a center of the each of the image frames and the detected target object from the extracted image data by the analytics unit; and updating the analytic dataset library in accordance with the distortion ratio by the analytics unit.

7. The method of claim 4, further comprising:

determining an orientation correction angle by the orientation correction processor of the image analysis system when a matching analytic dataset for the spatial difference factor is not found in the analytic dataset library within a predetermined variance window; and dynamically adjusting an orientation of the image sensor using the determined orientation correction angle by a position control processor of the image analysis system, in communication with the orientation correction processor.

8. The method of claim 7, further comprising:

notifying the analytics unit about orientation data associated with the dynamically adjusted orientation of the image sensor by the position control processor;

dynamically selecting an analytic dataset from the analytic dataset library by the analytics unit based on an updated spatial difference factor determined using the orientation data and the extracted image data; and comparing the extracted image data with the dynamically selected analytic dataset by the analytics unit, wherein a close match of the extracted image data with the dynamically selected analytic dataset validates the detection of the target object.

9. The method of claim 1, further comprising:

receiving and processing the image data comprising a plurality of images of the target object from the image sensor and the spatial data from the spatial sensor of the image analysis system by the orientation correction processor of the image analysis system, wherein the images of the target object are recorded by positioning a lens of the image sensor with respect to the target object in one or more of a plurality of recording configurations;

generating orientation data for each of the recorded images using the received and processed image data, the received and processed spatial data, and supplementary input data by the orientation correction processor;

comparing spatial difference factors determined from the generated orientation data for the each of the recorded images with the analytic dataset library by the analytics unit of the image analysis system; and generating, for the each of the recorded images, a supplementary analytic dataset associated with the generated orientation data by the analytics unit for optimizing the analytic dataset library when a matching analytic dataset for each of the spatial difference factors is not found in the analytic dataset library within a predetermined variance window.

10. The method of claim 9, wherein the recording configurations comprise a predetermined distance, a predetermined orientation, a predetermined time of a day, a predetermined date of a month, and any combination thereof.

11. The method of claim 1, further comprising optimizing the analytic dataset library by the analytics unit operably connected to the orientation correction processor of each of a plurality of image capture devices via a network, wherein the optimization of the analytic dataset library comprises:

receiving and processing the resultant image data from the orientation correction processor of the each of the image capture devices by the analytics unit;

extracting the orientation data and the image data from the received and processed resultant image data by the analytics unit;

comparing spatial difference factors determined from the extracted orientation data and the extracted image data with the analytic dataset library by the analytics unit; and generating a supplementary analytic dataset comprising the extracted image data associated with the extracted orientation data and the spatial difference factors by the analytics unit when a matching analytic dataset for each of the spatial difference factors is not found in the analytic dataset library within a predetermined variance window, and updating the analytic dataset library with the generated supplementary analytic dataset by the analytics unit.

12. The method of claim 1, further comprising compressing the generated resultant image data by a data compression processor in operable communication with the orientation correction processor of the image analysis system.

13. The method of claim 1, further comprising storing the generated resultant image data by a storage unit in operable communication with the orientation correction processor.

14. An image analysis system for detecting a target object from an image and validating the detection of the target object, the image analysis system comprising:

an orientation correction processor in operable communication with an image sensor and a spatial sensor, the orientation correction processor configured to receive and process image data of the target object from a series of image frames captured by the image sensor and spatial data from the spatial sensor;

the orientation correction processor further configured to generate orientation data using the received and processed image data, the received and processed spatial data, timestamp data, and supplementary input data;

the orientation correction processor further configured to generate resultant image data by associating the generated orientation data with the received and processed image data simultaneously for each of the image frames;

an analytics unit, in operable communication with the orientation correction processor, the analytics unit configured to receive the generated resultant image data from the orientation correction processor; and the analytics unit further configured to process and analyze the received resultant image data with reference to an analytic dataset library to detect the target object from the image and validate the detection of the target object.

15. The image analysis system of claim 14, wherein the image data comprises image data captured by the image sensor, and wherein the supplementary input data comprises a type of a lens of the image sensor, a curvature of the image sensor, a size of the image sensor, and a resolution of the image sensor.

16. The image analysis system of claim 14, wherein the spatial data comprises spatial coordinates of a center point of the image sensor, spatial coordinates of the image sensor with respect to a horizontal ground plane, relative coordinates of the target object in the each of the image frames, and spatial alignment data of the image sensor with respect to the target object, and wherein the spatial data is configured to define an orientation of the target object with respect to an image capture device that accommodates the image sensor.

17. The image analysis system of claim 14, wherein the analytics unit is further configured to extract the orientation data and the image data from the received resultant image data, and wherein the analytics unit is further configured to dynamically select an analytic dataset from the analytic dataset library based on a spatial difference factor determined from the extracted orientation data and the extracted image data, and wherein the analytics unit is further configured to compare the extracted image data with the dynamically selected analytic dataset, wherein a close match of the extracted image data with the dynamically selected analytic dataset validates the detection of the target object.

18. The image analysis system of claim 17, wherein the analytics unit is further configured to generate a supplementary analytic dataset comprising the extracted image data associated with the extracted orientation data and the spatial difference factor when a matching analytic dataset for the spatial difference factor is not found in the analytic dataset library within a predetermined variance window, and update the analytic dataset library with the supplementary analytic dataset.

19. The image analysis system of claim 17, wherein the analytics unit is further configured to determine the spatial difference factor as a distortion ratio of the extracted orientation data and a spatial coordinate difference determined between a center of the each of the image frames and the detected target object from the extracted image data, and update the analytic dataset library in accordance with the distortion ratio.

20. The image analysis system of claim 14, wherein the orientation correction processor is further configured to determine an orientation correction angle when a matching analytic dataset for the spatial difference factor is not found in the analytic dataset library within a predetermined variance window.

21. The image analysis system of claim 20, further comprising a position control processor in operable communication with the orientation correction processor and the analytics unit, wherein the position control processor is configured to dynamically adjust an orientation of the image sensor using the determined orientation correction angle.

22. The image analysis system of claim 21, wherein the position control processor is further configured to notify the analytics unit about orientation data associated with the dynamically adjusted orientation of the image sensor, and wherein the analytics unit is further configured to dynamically select an analytic dataset from the analytic dataset library based on an updated spatial difference factor determined using the orientation data and the extracted image data, and wherein the analytics unit is further configured to compare the extracted image data with the dynamically selected analytic dataset, wherein a close match of the extracted image data with the dynamically selected analytic dataset validates the detection of the target object.

23. The image analysis system of claim 14, wherein the orientation correction processor is further configured to receive and process the image data comprising a plurality of images of the target object from the image sensor and the spatial data from the spatial sensor, wherein the images of the target object are recorded by positioning a lens of the image sensor with respect to the target object in one or more of a plurality of recording configurations, and wherein the orientation correction processor is further configured to generate orientation data for each of the recorded images using the received and processed image data, the received and processed spatial data, and supplementary input data and transmit the generated orientation data to the analytics unit.

24. The image analysis system of claim 23, wherein the analytics unit is further configured to compare spatial difference factors determined from the generated orientation data for the each of the recorded images with the analytic dataset library, and wherein the analytics unit is further configured to generate, for the each of the recorded images, a supplementary analytic dataset associated with the generated orientation data for optimizing the analytic dataset library when a matching analytic dataset for each of the spatial difference factors is not found in the analytic dataset library within a predetermined variance window.

25. The image analysis system of claim 23, wherein the recording configurations comprise a predetermined distance, a predetermined orientation, a predetermined time of a day, a predetermined date of a month, and any combination thereof.

26. The image analysis system of claim 14, wherein the analytics unit is operably connected to the orientation correction processor of each of a plurality of image capture devices via a network, wherein the analytics unit is further configured to perform:

receiving and processing the resultant image data from the orientation correction processor of the each of the image capture devices;

extracting the orientation data and the image data from the received and processed resultant image data;

comparing spatial difference factors determined from the extracted orientation data and the extracted image data with the analytic dataset library; and generating a supplementary analytic dataset comprising the extracted image data associated with the extracted orientation data and the spatial difference factors when a matching analytic dataset for each of the spatial difference factors is not found in the analytic dataset library within a predetermined variance window, and updating the analytic dataset library with the generated supplementary analytic dataset.

27. The image analysis system of claim 14, further comprising a data compression processor in operable communication with the orientation correction processor, wherein the data compression processor is configured to compress the generated resultant image data.

28. The image analysis system of claim 14, further comprising a storage unit in operable communication with the orientation correction processor, wherein the storage unit is configured to store the generated resultant image data.

* * * * *